Aug. 15, 1950 G. L. SIMPSON 2,519,296
APPARATUS FOR CONDITIONING GASES
Filed Oct. 20, 1945 3 Sheets-Sheet 3
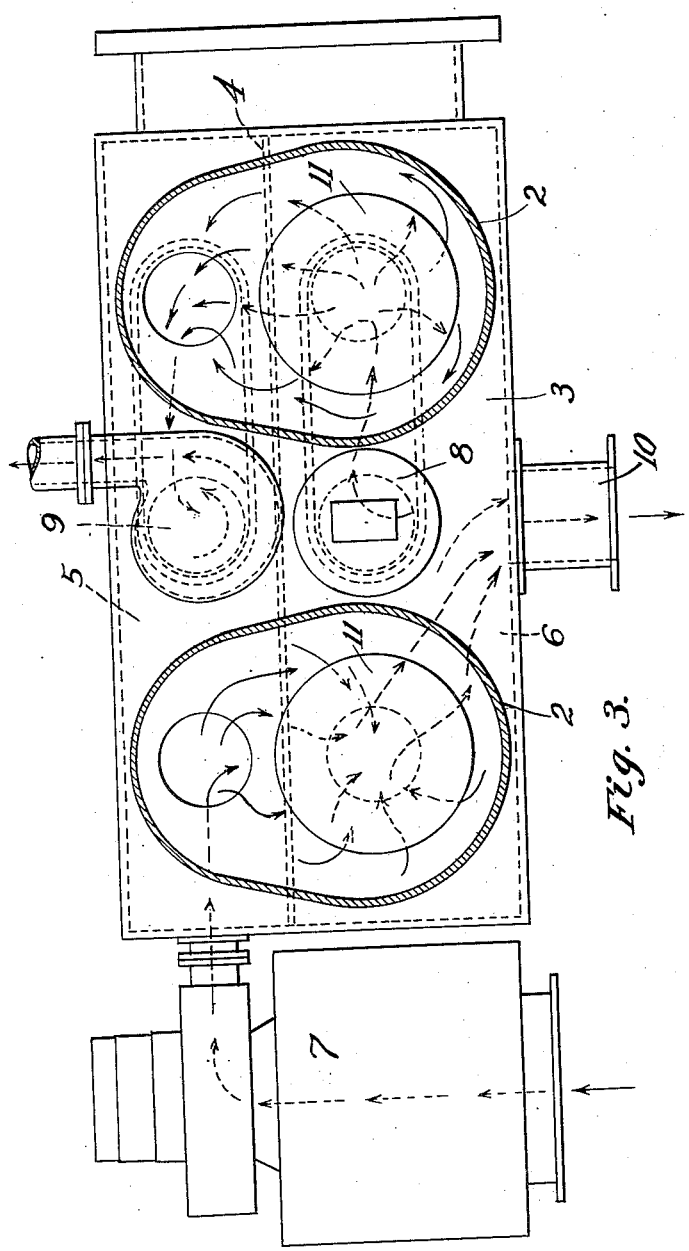
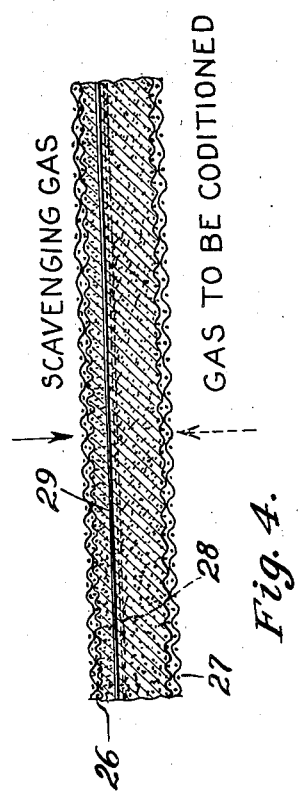
INVENTOR
George L. Simpson
by his attorneys
Christy, Parmelee Struckland.

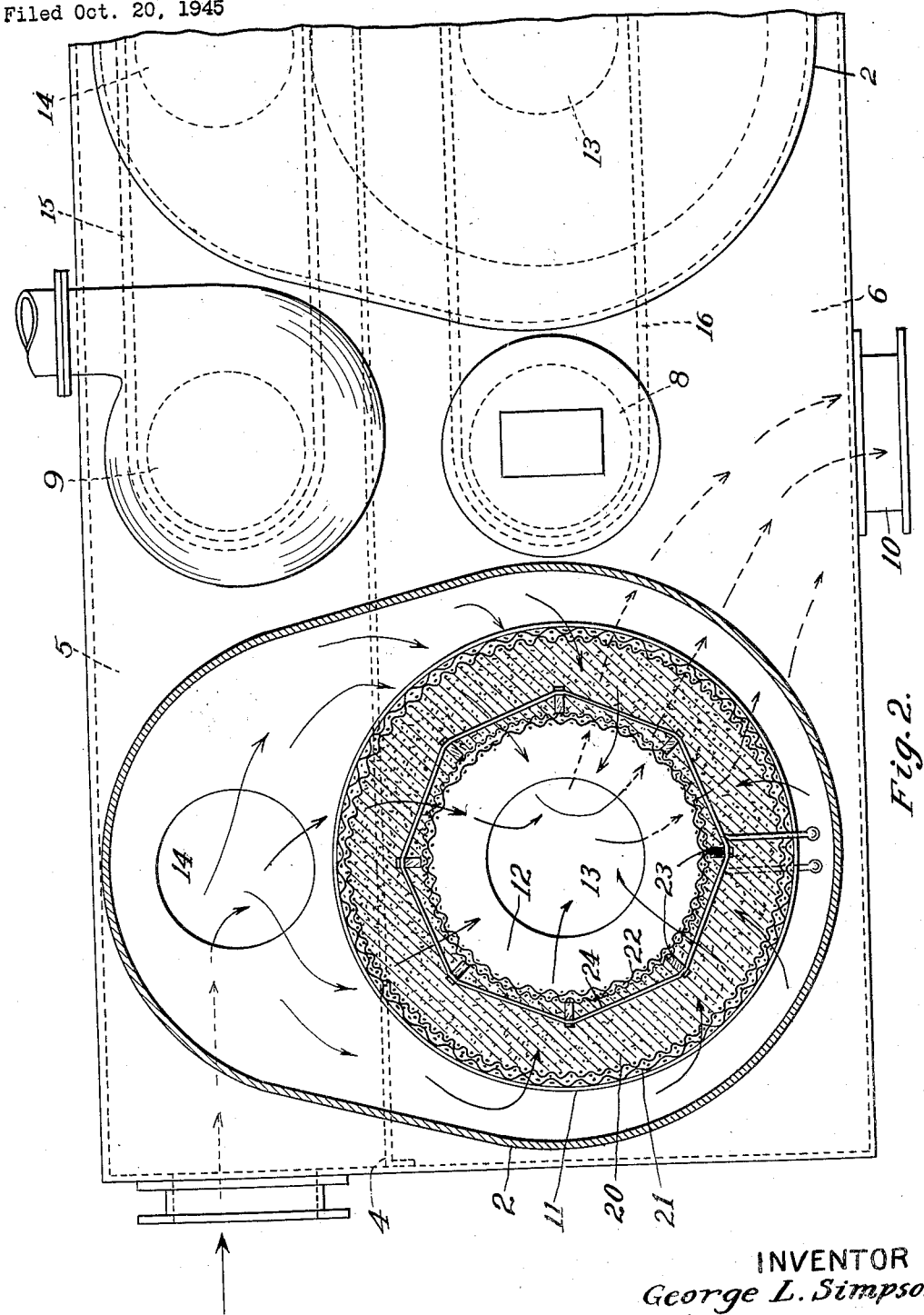

Patented Aug. 15, 1950

2,519,296

UNITED STATES PATENT OFFICE 2,519,296

APPARATUS FOR CONDITIONING GASES

George L. Simpson, Edgeworth, Pa., assignor to Delaware Engineering Corporation, Pittsburgh, Pa., a corporation of Delaware Application October 20, 1945, Serial No. 623,512

9 Claims. (Cl. 183—4.5)

This invention relates to an apparatus for conditioning gases including air in which the gas to be treated or conditioned is passed through an adsorbent earth or other adsorbent material, and is particularly for an improved adsorbent body having a contained electrical heating unit.

In apparatus of the type above referred to, gas to be treated is caused to flow through the adsorptive earth, which commonly is a granular material confined between reticulated or other screens. As the gas passes through the adsorbtive material, water, condensates or other entrained liquids or condensible vapors are adsorbed by the earth or other reagent. After a given cycle of operation, the reagent becomes fouled with adsorbed materials and then the reagent or adsorbtive earth must be reactivated. This is accomplished, as is well known in the art, by cutting off the flow of gases to be treated, and then blowing a scavenging gas, such as air at elevated temperature, through the reagent to volatilize and carry off the adsorbed impurities. In most instances it has been proposed to heat the scavening air before it enters the reagent, as in Moore Patent No. 2,101,555, granted December 7, 1937, and it has also been proposed to embed electric resistance heating units in the adsorbent body.

The present invention relates to that type of adsorber in which there is such an electric resistance heating element in the body, and has for its object to substantially and to an unexpected extent increase the efficiency and performance of the equipment, and this with practically no added cost.

Generally this is effected by so placing the heating unit in the bed and operating the absorber that there are negligible radiation losses and the gas to be treated, when the unit is on the gas treating cycle moves toward a progressively hotter and therefore drier mass of adsorbent, but when the adsorber is on a reactivating cycle, the scavenging air first contacts the hottest part of the mass, and then carries the heat into the adsorbent bed toward its opposite face, to progressively dry the bed so that when the scavenging air emerges from the bed, most of the heat will have been given up and the air picked up a full burden of impurities, thereby most effectively utilizing the heat.

My invention may be more fully understood by reference to the accompanying drawings, in which:

Fig. 2 is a plan view, partly in horizontal section of a two unit gas conditioner, wherein one unit may be on an operating cycle while the other is on a reactivation cycle, the units being constructed as shown in Fig. 1;

Fig. 3 is a top plan view on a smaller scale of the assembly shown in Fig. 2, showing more fully the gas flow, the outside shells of the adsorber units being in section; and Fig. 4 is a fragmentary view, which is more or less schematic, representing a portion only of an adsorber of any shape, and embodying my invention.

Figure 1:
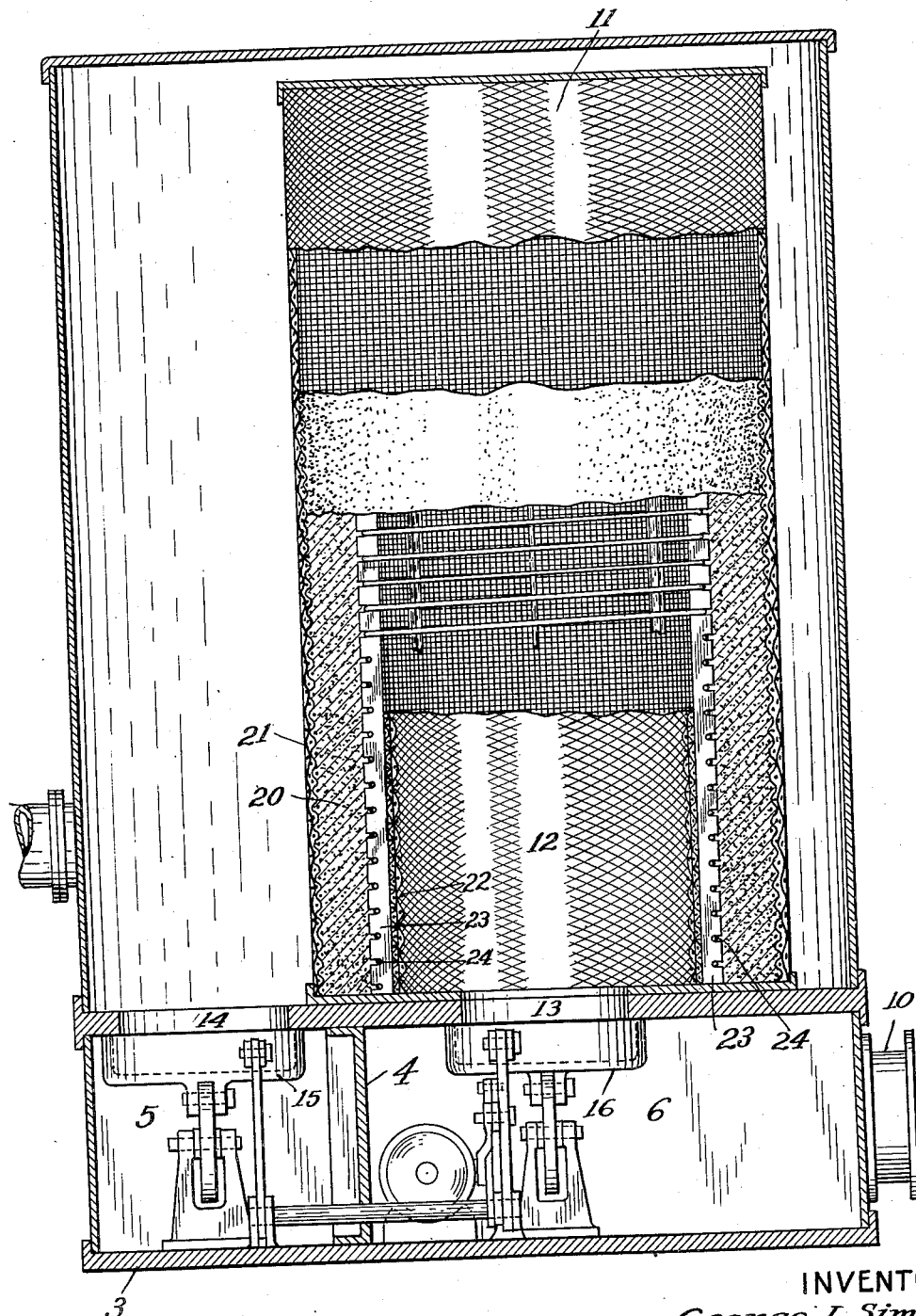
Fig. 1 is a vertical section through one adsorber unit constructed to operate and for operation according to my invention.

Referring first to Fig. 3, the apparatus illustrated is organized according to the general arrangement shown in the Moore patent above referred to. There are two metal shells or casings 2 of like construction on a base 3, the base having a longitudinally extending partition 4 providing two chambers or passages 5 and 6. A blower or pump is indicated at 7 for blowing gas to be treated, typically air to be conditioned, into one end of passage 5. A down pipe 8 for scavenging air is located between the two shells, it being above passage 6, and an offtake pipe 9 for scavenging gas is located over chamber 5 between the two shells. Conditioned gas is removed through outlet duct 10 communicating with passage 6.

In each shell there is an adsorber unit designated generally as 11, which is shown to be cylindrical with its axis vertical, each unit having a central chamber 12. At the bottom of each central chamber 12 there is a port 13 opening through the bottom and at each side of each unit 11 is a port 14 opening through the bottom.

There is a longitudinally extending slide valve element of trough-like form, designated 15 in passage 5 and a like valve 16 in passage 6. With the valves 15 and 16 in the dotted line position shown in Fig. 3, gas from the blower enters chamber 5, rises through port 14 into the left-hand shell, passes through the adsorber unit 11, flows down through port 13 into chamber 6 and thence to the treated gas discharge duct 10. At the same time scavenging gas flows down pipe 8, along the valve 16 to port 13 in the bottom of the right-hand unit 11, into the interior of that unit, through the walls thereof, out through port 14 into valve 15 and thence to scavenging gas offtake pipe 9. When the operation is to be reversed, the two valves 15 and 16 are merely shifted to the left so as to direct the scavenging air through the left-hand unit and allow the gas to be treated to flow through the right-hand unit. So much of the apparatus as has been described is generally known to the art and forms no part of the present invention per se, except insofar as it is important to the functioning of the particular constructions hereinafter described.

Each of the adsorber units 11 is illustrated as comprising a mass of adsorbtive earthen particles 20 confined between an outer reticulated screen or other perforated wall 21 and a similar inner wall 22. The screens function to hold the adsorbent material in position and permit the flow of gases therethrough.

Just inside the inner wall 22 there are shown ceramic or other insulating strips 23 notched on the edges thereof to receive a resistance heating wire 24. As clearly shown in Fig. 2, the electric resistance heating element, while being supported on the ceramic supports 23 at spaced intervals, is embedded in the adsorbtive material itself, there being adsorbtive material, as shown in Fig. 2 radially inward from the resistance element as well as radially outward.

The important feature in the contruction is that the resistance unit, instead of being symmetrically disposed in the adsorbent material, is very much closer, in the particular construction shown, to the inner wall of the unit than the outer one. The thin layer of adsorbtive earth between the resistance unit and the inner wall 22 serves as a heat screen to prevent dissipation of heat by direct radiation into the hollow interior of the unit. While the granular particles immediately surrounding the resistor become very highly heated, the adsorbtive material is a good thermal insulator. The highly heated particles extend close to the inner screen, but as above stated, they block the direct radiation of any substantial heat into the interior of the hollow unit. Also the large mass of adsorbtive material between the electric heating element and the outside of the unit prevents loss of heat by radiation outwardly.

In Figs. 1 to 3 inclusive, the adsorbtive unit is illustrated as being of cylindrical form, this being the preferred form, but the invention is applicable to an adsorbtive unit which is a plane, or which is of any other shape, and Fig. 4 shows merely a section of the adsorber unit with arrows and legends indicating the direction of the gas flow. In this view 26 and 27 designate the screens for confining the intervening body of adsorbtive material 28, and 29 is the electric heating unit which is embedded in the adsorbent relatively close to the surface on one side and remote from the other surface. The solid arrow indicates the direction of flow with reference to the adsorber wall section of the scavenging gas, and the dotted arrow indicates the flow with reference to the gas to be treated.

In the operation of the adsorber according to the method of the present invention, it may be assumed that the adsorber has been treating gas, such as air to be conditioned, and the adsorbent particles have become fouled with moisture or other impurities. During the treating portion of the cycle, as in the scavenging portion, the electric heating unit is operated at a predetermined temperature. Under the conditions assumed, the flow of gas to be treated is shut off and the scavenging gas is then blown through the adsorber unit. Where the unit is cylindrical with the heating element near the inner wall, the scavenging gas, as clearly shown in Fig. 3, passes up through the center of the cylindrical unit, passes through the unit into the space around the unit, and escaping in the manner hereinbefore described. This scavenging gas, as soon as it starts to pass through the adsorber, immediately comes into contact with heated particles that are relatively close to the electric heating element, and therefore the scavenging gas is heated, and its moisture adsorbing properties are increased. The heated gas then travels into progressively cooler portions of the main bed of the adsorbent, carrying heat into the adsorbent and evaporating moisture or volatiles from the adsorbent. The heat generated by the electric heating element is thus effectively used in scavenging the adsorbent and before the effluent scavenging gas from the adsorber becomes warm enough to result in the loss of such heat by reason of the mass of reagent becoming entirely hot the operation of scavenging is completed. There is no appreciable loss of heat from the surface near which the heating element is located because of the overlying thin layer of granular substance, and the heat which is picked up by the air from the electric element and the granular particles adjacent it is carried, as above explained, further into the adsorbent bed to accomplish useful work.

After the bed has been activated, the cycle is again reversed and the gas to be treated is then circulated through the adsorber. It is circulated as previously explained, in a direction opposite the flow of the scavenging gas. The gas to be treated thus first strikes the coolest portion of the reagent and then moves progressively toward a zone where the particles are located which were subjected to the greatest heat and are therefore more effective to adsorb impurities and moisture, and finally the gas emerges at the hottest part of the adsorber in a warm, dry condition.

The invention results in an unexpectedly improved efficiency arising from the fact that heat losses by radiation are negligible, particularly where the unit is cylindrical and the heaters are on the surface near the hollow interior of the cylinder, and added efficiency results from heat being used more effectively in the operation of the adsorber. As has been heretofore indicated, the adsorber unit does not have to be cylindrical nor does the heating element have to be at the inner face of a cylindrical unit. The important feature of the present invention is the location of the heating unit close to, or at one surface of the adsorber, and the circulation of gases so that when the unit is being reactivated, the scavenging gas first contacts the hottest part of the adsorber, and when the unit is being operated on the gas conditioning part of the cycle, the gas to be treated leaves the hottest part of the adsorber.

In the particular construction herein described, the heating element is close to one surface of the unit, but loss of heat by radiation is prevented by the thin layer of adsorbent granules between the electric element and the face of the unit which it is nearest, inasmuch as the adsorbent material provides a convenient and useful insulating screen. However, in lieu of this particular insulation between the heater and the surface to which it is close, any other appropriate heat insulating medium may be used.

While I have illustrated and described certain particular embodiments of my invention, it will be understood that various changes and modifications may be made therein, and that the invention is not restricted to the specific apparatus illustrated and described.

I claims:

1. Gas conditioning apparatus comprising a conditioning unit with an adsorptive bed arranged about a central chamber, an electric heating element embedded in the adsorptive material adjacent the portion of the bed which forms the wall for said chamber, the mass of the bed lying outside the electric heating element, and means for circulating gas to be treated from the outside of the unit through the bed to the chamber, and means for alternately passing scavenging gas through the unit in the opposite direction.

2. In an adsorber unit for the conditioning of gases, a base, a casing having a gas impervious continuous wall and a closed cover on top of the wall on the base, a tubular body of granular adsorbent material having a gas impervious top cover within the casing and spaced from the side walls and the top of the casing, a port connecting the base with the space enclosed by the tubular body of adsorbent, a second port connecting the base with the space between the casing wall and the tubular body, means to pass gas from one of said ports through the tubular body of adsorbent material to the other port, and a heating element of generally tubular form embedded in the granular material adjacent the inner surface of the tubular body.

3. In a gas conditioning unit, a casing, a body of adsorbent material enclosing a centrally disposed space, the body being within the casing and disposed to form a space between the casing and body, a heating element embedded in the body close to the wall adjoining the centrally disposed space, and means whereby scavenging gas may be passed from the space adjacent the heating element through the adsorbent material to the other space.

4. In gas conditioning apparatus wherein gas to be treated flows in one direction through an adsorbent bed and scavenging gas flows alternately with the gas being treated, but in the opposite direction, the combination comprising a casing having a tubular adsorbent filled unit mounted therein with its outer surfaces spaced from the inner surface of the casing to provide a gas passage, said adsorbent unit having a cylindrical space centrally thereof providing a second gas passage which is in communication with the first mentioned gas passage through the adsorbent unit, and a cylindrical heating unit having heating elements closely adjacent the inner surface of the adsorbent unit.

5. In gas conditioning apparatus wherein gas to be treated flows in one direction through an adsorbent bed and scavenging gas flows alternately with the gas being treated, but in the opposite direction, the combination comprising a casing having a tubular adsorbent filled unit mounted therein with its outer surfaces spaced from the inner surface of the casing to provide a gas passage, said adsorbent unit having a cylindrical space centrally thereof providing a second gas passage which is in communication with the first mentioned gas passage through the adsorbent unit, and a cylindrical heating unit, the heating unit having a plurality of spaced apart vertical supports formed from electrically insulating material located adjacent the inner surface of the adsorbent, and an electric resistance heating element supported on said supports at spaced intervals.

6. In gas conditioning apparatus wherein gas to be treated flows in one direction through an adsorbent bed and scavenging gas flows alternately with the gas being treated, but in the opposite direction, the combination comprising a casing having a tubular adsorbent filled unit mounted therein with its outer surfaces spaced from the inner surface of the casing to provide a gas passage, said adsorbent unit having a cylindrical space centrally thereof providing a second gas passage which is in communication with the first mentioned gas passage through the adsorbent unit, and a cylindrical heating unit, the heating unit having a plurality of spaced apart vertical supports formed from electrically insulating material located adjacent the inner surface of the adsorbent, said supports having notches therein at spaced vertical intervals, and an electric resistance heating element wound helically through the notches, the heating elements being located close to the inner surface of the adsorber.

7. In gas conditioning apparatus wherein gas to be treated flows in one direction through an adsorbent bed and scavenging gas flows alternately with the gas being treated, but in the opposite direction, the combination comprising an outer casing having an impervious wall, a tubular adsorbent unit having an outer wall spaced from the inner wall of the casing to define a gas passage, and an inner wall spaced from the outer wall, both the outer wall and the inner wall being gas pervious, adsorbent material between said outer and inner walls, the inner wall defining a second gas passage, said gas passages being in communication through the adsorbent unit, and a tubular heating unit embedded in the adsorbent material closely adjacent to the inner wall of the adsorber unit.

8. In gas conditioning apparatus wherein gas to be treated flows in one direction through an adsorbent bed and scavenging gas flows alternately with the gas being treated, but in the opposite direction, the combination comprising an outer casing having an impervious wall, a tubular adsorbent unit having an outer wall spaced from the inner wall of the casing to define a gas passage, and an inner wall spaced from the outer wall, both the outer wall and the inner wall being gas pervious, adsorbent material between said outer and inner walls, the inner wall defining a second gas passage, said gas passages being in communication through the adsorbent unit, and a tubular heating unit embedded in the adsorbent material closely adjacent to the inner wall of the adsorber unit, said heating unit having a plurality of spaced apart vertically disposed electrically insulating strips and an electric resistance heating wire helically wound around and supported on the insulating strips.

9. In gas conditioning apparatus wherein gas to be treated flows in one direction through an adsorbent bed and scavenging gas flows alternately with the gas being treated, but in the opposite direction, the combination comprising an outer casing having an impervious wall, and a uniform cover, a tubular adsorbent unit having an outer wall spaced from the inner wall of the casing to define a gas passage, and an inner wall being gas pervious, adsorbent material between said outer and inner walls, the inner wall defining a second gas passage, said gas passages being in communication through the adsorbent unit, an impervious cover on the adsorbent unit, said cover being spaced from the cover of the outer casing, and a tubular heating unit embedded in the adsorbent material closely adjacent to the inner wall of the adsorber unit.

GEORGE L. SIMPSON.

REFERENCES CITED

The following references are of record in the file of this patent:

UNITED STATES PATENTS

| Number | Name | Date |
| --- | --- | --- |
| 1,986,814 | Hartman | Jan. 7, 1935 |
| 2,101,555 | Moore et al. | Dec. 7, 1937 |